Jan. 17, 1933.  G. B. SCHEIBELL  1,894,637
OSCILLATION SYSTEM
Filed June 26, 1931
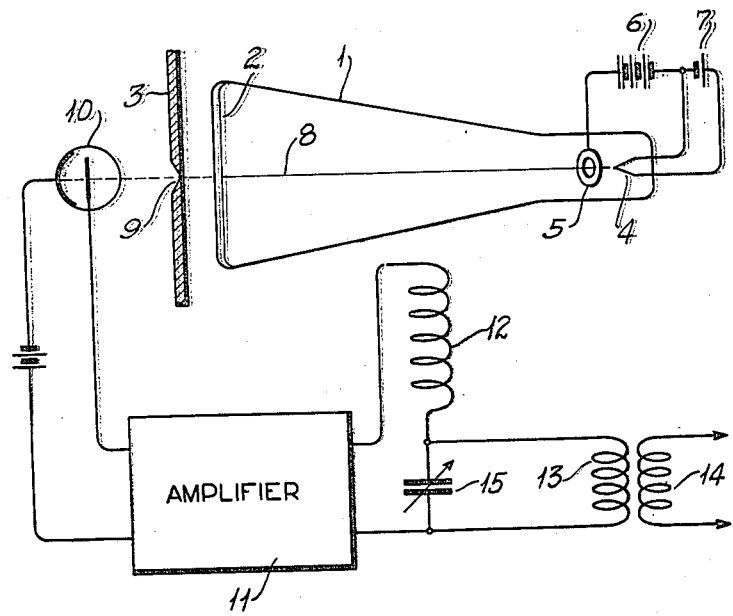
INVENTOR
Gordon Brown Scheibell
BY
*Wm. J. Herdman*
ATTORNEY Patented Jan. 17, 1933

1,894,637

UNITED STATES PATENT OFFICE

GORDON BROWN SCHEIBELL, OF NEWARK, NEW JERSEY, ASSIGNOR TO WIRED RADIO, INC., OF NEW YORK, N. Y., A CORPORATION OF DELAWARE

OSCILLATION SYSTEM

Application filed June 26, 1931. Serial No. 546,939.

My invention relates to means for producing sustained electrical oscillations.

One of the objects of my invention consists in providing an oscillation generator in which a circuit controlled by a photoelectric cell produces sustained oscillations.

A further object comprises producing an oscillation system in which a photosensitive cell under control of a cathode ray tube produces sustained oscillations.

These and other desirable objects will be apparent from the following taken in conjunction with the accompanying drawing, which diagrammatically represents one embodiment of my invention.

My invention contemplates providing a cathode ray tube for producing fluorescent irradiations incident upon a photoelectric cell. This photoelectric cell controls an electromagnetic field which, in turn, influences the cathode ray producing the fluorescent irradiations to maintain sustained oscillations in a work circuit. Referring to the drawing, I provide a cathode ray tube 1, having a fluorescent screen 2 adjacent an aperture plate 3. The aperture plate 3 is composed of opaque material and has a transparent aperture 9. The cathode ray tube is of conventional construction and consists of a cathode 4 and anode 5, disposed within a suitable evacuated envelope 1. A source of anode voltage 6 is connected between the anode 5 and cathode 4, while a source of current 7 is provided for heating the cathode 4. When normally operating, the cathode 4 emits an electric discharge which produces a cathode ray 8 under influence of the anode. The cathode ray 8 impinges upon the fluorescent screen 2 to produce an area of fluorescent illumination adjacent the aperture 9 in the opaque aperture plate 3. A photoelectric cell 10 is positioned proximate to the aperture plate 3, in a position such that the photosensitive cathode of the photoelectric cell 10 normally receives, through the aperture 9, the fluorescent irradiations which originate at the fluorescent screen 2 under influence of the cathode ray 8. The photoelectric cell 10 is connected through a suitable thermionic amplifier 11 which augments the energy value of the photoelectric current produced in the photoelectric cell under the influence of light. The energy output from amplifier 11 is directed through a winding 12, and through an inductance 13 electromagnetically coupled to an inductance 14. A capacitance 15 is provided in circuit with the winding 12 to effect tuning of the entire output circuit to certain desired frequencies. The inductance 14 is indicative of a work circuit for the utilization of sustained oscillations.

The operation of my oscillation system to produce sustained oscillations is as follows:

The cathode ray 8 impinging on the fluorescent screen 2 produces irradiations directed through the aperture 9 upon the cathode of the photoelectric cell 10. These irradiations produce a photoelectric current which acts through the amplifier 11 to cause the winding 12 to produce an electromagnetic field in the vicinity of the cathode ray 8. In the construction of my system the coil 12 is situated so that the lines of force of the electromagnetic field are substantially at right angles to the axis of the cathode ray 8. The cathode ray 8, acted upon by the electromagnetic field, is deflected to another part of the screen 2 so that the fluorescent irradiations are produced at a point out of range of the aperture 9 so that no illumination will fall upon the photoelectric cell 10. As soon as the illumination is removed from the cathode of the photoelectric cell 10, the energy supplied to the winding 12 will be interrupted and the electromagnetic field produced thereby will collapse. As soon as the electromagnetic field is removed, the cathode ray 8 will return to its normal position whereby fluorescent irradiations are produced by the screen 2 at a point such that the photoelectric cell 10 will be illuminated through aperture 9. When the photoelectric cell 10 is illuminated, a photoelectric current will again be produced to cause the winding 12 to again produce an electromagnetic field in the vicinity of the cathode ray 8.

It will be evident that the cycle of operations of the system will be regularly repeated at a high frequency depending upon the tuning of the output circuit, as determined by the ratio of the value of inductance to the value of the capacitance 15. To produce sustained oscillations at lower frequencies, the field winding 12 may be provided with an iron core, whereby the rate of oscillation will be reduced. The sustained oscillations produced in the inductance 13 will set up corresponding electromotive forces in the inductance 14 which may be utilized in any desired manner.

It will be apparent from the foregoing that I have provided a novel system for producing sustained oscillations through the cooperation of a cathode ray tube and photoelectric cell. Although I have shown a preferred embodiment of my invention, I do not wish to be limited thereto except insofar as may be pointed out in the appended claims.

What I claim as new and original and desire to secure by Letters Patent of the United States is:

1. An oscillation system comprising, a cathode ray tube having a fluorescent screen, a photosensitive device, an apertured plate disposed between said fluorescent screen and said photosensitive device in such manner that the irradiations from said fluorescent screen normally impinge upon said photosensitive device through the aperture in said plate, an output circuit for said photosensitive device and means connected to said output circuit for producing an electromagnetic field in the vicinity of the cathode ray within said cathode ray tube to deflect said ray to vary the irradiations projected through the aperture in said plate upon said photosensitive device in a manner to produce sustained oscillations.

2. An oscillation system comprising, a cathode ray tube having a fluorescent screen, a photosensitive device, an apertured plate disposed between said fluorescent screen and said photosensitive device in such manner that the irradiations from said fluorescent screen normally impinge upon said photosensitive device through the aperture in said plate, an output circuit for said photosensitive device and means connected to and controlled by said output circuit for operating the cathode ray within said tube in such manner that light from said fluorescent screen is interrupted by said apertured plate and caused to periodically impinge upon said photosensitive device to produce sustained oscillations.

3. An oscillation system comprising, a cathode ray tube having a fluorescent screen, a photosensitive device, an apertured plate disposed between said fluorescent screen and said photosensitive device in such manner that the irradiations from said fluorescent screen normally impinge upon said photosensitive device, an output circuit for said photosensitive device and means in said output circuit for oscillating the cathode ray in said tube so that the light from said fluorescent screen is periodically projected through the aperture in said plate to said photosensitive device in synchronism with variations in the current in said output circuit to produce sustained oscillations.

GORDON BROWN SCHEIBELL.